M. C. ROSENFELD.
HOSE RACK.
APPLICATION FILED APR. 19, 1915.

1,209,038.

Patented Dec. 19, 1916.
2 SHEETS—SHEET 1.

M. C. ROSENFELD.
HOSE RACK.
APPLICATION FILED APR. 19, 1915.

1,209,038.

Patented Dec. 19, 1916.
2 SHEETS—SHEET 2.

WITNESSES:
R. L. Bruck
H. J. Small

INVENTOR,
Mortimer C. Rosenfeld
BY Hull and Smith
ATT'YS.

UNITED STATES PATENT OFFICE.

MORTIMER C. ROSENFELD, OF CLEVELAND, OHIO.

HOSE-RACK.

1,209,038.

Specification of Letters Patent.   Patented Dec. 19, 1916.

Application filed April 19, 1915.   Serial No. 22,265.

*To all whom it may concern:*

Be it known that I, MORTIMER C. ROSENFELD, a citizen of the United States, residing at Cleveland, in the county of Cuyahoga and State of Ohio, have invented a certain new and useful Improvement in Hose-Racks, of which the following is a full, clear, and exact description, reference being had to the accompanying drawings.

This invention relates to improvements in racks that are employed for supporting fire hose in convenient arrangement for instant use; and it has for its object to provide a device of this character that may be readily attached to stand pipes of water systems, and support hose in successive folds and in a manner that will cause the same to be "paid out", fold at a time, as the hose is withdrawn from the rack.

The advantage of releasing successive folds of the hose, as the hose is stretched out to its full length, over the scheme of dropping the entire hose into a mass by the collapsing of the rack as is the case in many existing types of devices of this character, will be appreciated by any one bearing in mind the conditions under which a rack of this kind is required to be used.

Further objects of my invention are to provide a rack that is always in readiness for use; that is infallible in its operation; and that can be conveniently readjusted to hose supporting condition after the same has been used. And a still further object of the invention is to provide a simplified means of attaching the rack to pipes of various sizes without the need of bolts, or their equivalents.

The foregoing objects, and others which will become apparent as this description proceeds, are attained in a device constructed in accordance with the accompanying drawings, which form a part hereof; and while I will proceed to describe in detail the hose rack shown therein, I wish to be understood as not limiting myself to the structural details thereof, further than is required by the terms of the annexed claims, and is rendered necessary by the state of the prior art.

Figure 1:
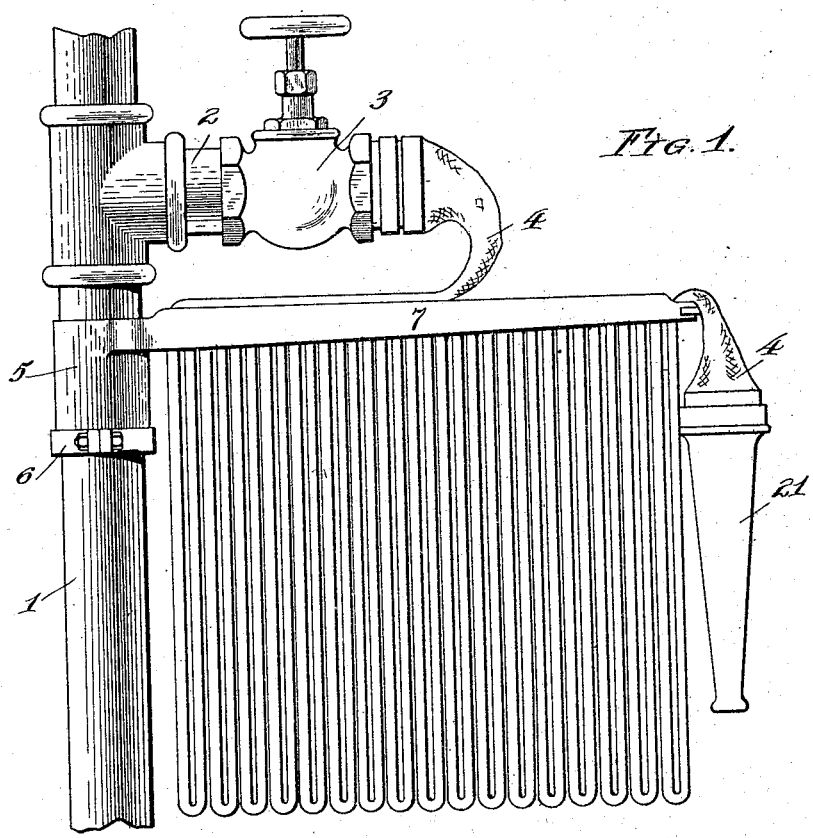
Figure 2:
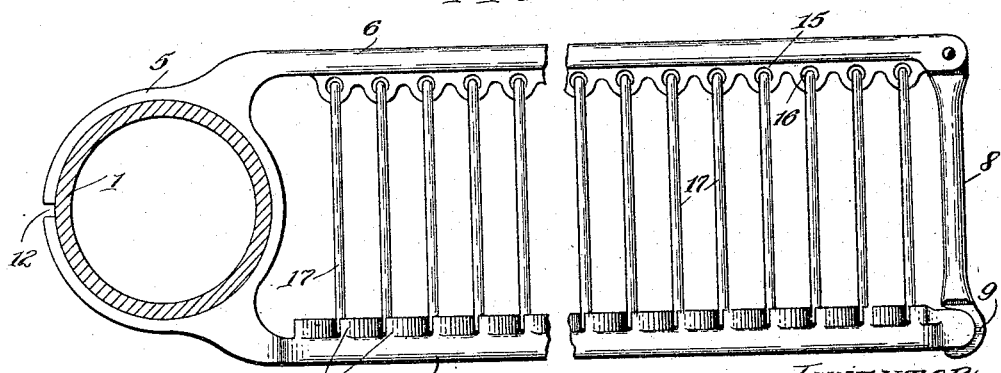
Figure 3:
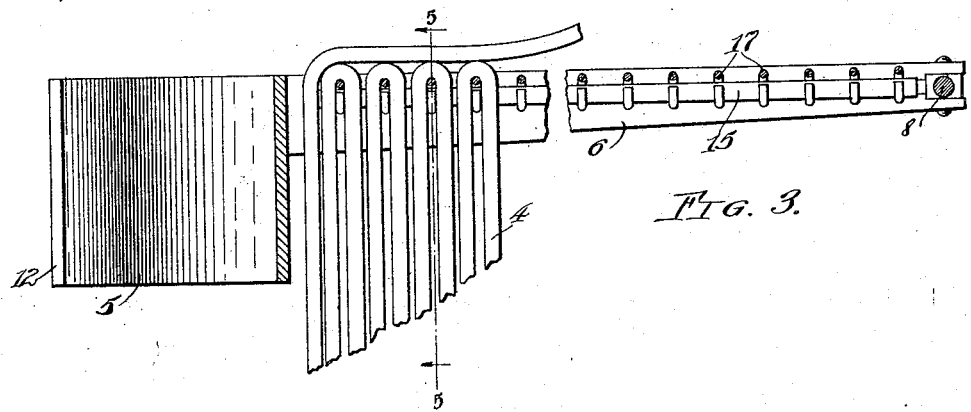
Figure 4:
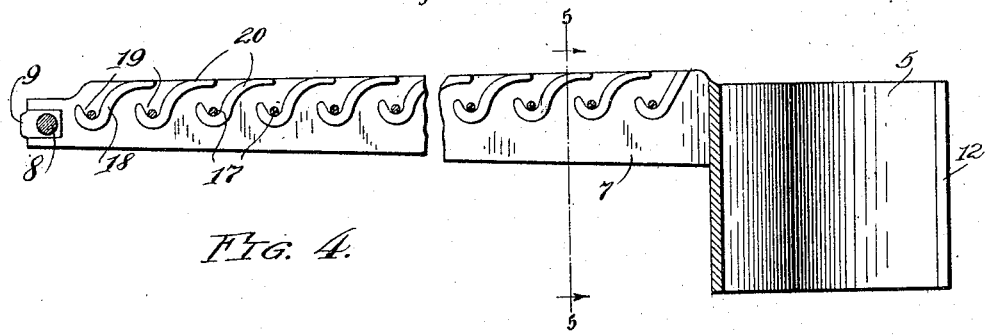
Figure 5:
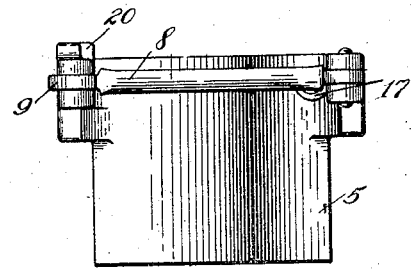
Figure 6:
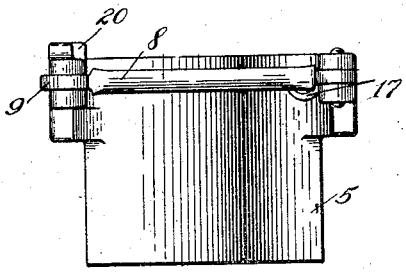
Figure 7:
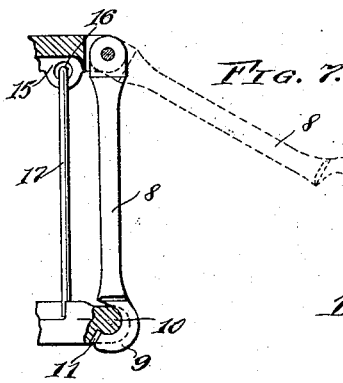

In the drawings, Figure 1 represents a side elevation of a hose rack of my invention, applied to the stand pipe of a water system, and supporting a hose; Fig. 2 is a plan of the rack in hose supporting position, the hose being omitted, and the stand pipe to which it is attached being shown in section, the rack being shortened by having its central portion broken away; Figs. 3 and 4 are longitudinal vertical sections through the rack, the respective figures showing opposite sides of the rack, and the former including a fragment of a hose; Fig. 5 is a sectional detail on the lines 5—5 of Figs. 3 and 4; Fig. 6 is a front elevation of the rack; and Fig. 7 is a horizontal section through the front end of the rack, showing in detail the horizontal latch bar which supports the nozzle end of the hose, and which, when in normal position, imparts rigidity to the free ends of the arms of the rack.

Taking up a detailed description of the invention by the use of reference characters, 1 represents a stand pipe of a water system that is provided with a lateral extension 2, having a valve 3, to which is attached one end of a hose 4. Immediately below the lateral extension 2, the supporting member 5 of my improved hose rack embraces the stand pipe 1 and may be supported by a collar 6, which is clamped to the pipe.

Extending substantially horizontal from the upper end of the supporting member, and substantially parallel to each other, is a pair of arms 6 and 7, and within a horizontal notch in the free end of the arm 6 is pivoted the end of a latch bar 8 (see Figs. 6 and 7) and the free end of this bar is flattened and formed into a hook 9 that is adapted to embrace a head 10, formed within a recess 11, in the outer end of the arm 7.

It will be explained that the supporting member 5 and arms 6 and 7 are preferably formed of a malleable casting, and the rear wall of the substantially cylindrical supporting member 5 is split at 12. This allows the circumference of the supporting member to be varied to fit different sizes of pipes, by bending the side walls of said member toward or from each other. Also, it will be explained that the latch bar 8 may be made of a length that will cause the arms 6 and 7 to be slightly under tension when the bar is in latched position for a purpose which will be explained hereinafter.

The inside of the arm 6 is provided with a ridge 15 that has a series of perforations 16 through which are looped one end of the hose supporting pins 17, this construction providing a very convenient and economical method of pivotally connecting the pins to the arm 6. The opposed surface of the arm 7 has formed upon it a series of ridges 18 of compound curvature so that the forward ends of the ridges form upwardly opening pockets 19, while the rear ends thereof constitute guards 20 which extend upward and over the pocket next to the rear, and act to guide the free ends of the pins 17 during their removal from the pockets. Preferably the pins 17, adjacent the outer end of the rack, are of a length to cause their free ends to engage the vertical walls of the pockets 19, when the arms 6 and 7 are held together by the latch 8. This holds the pins against displacement until the latch bar has been released.

The hose 4 is arranged in successive folds, as shown in Figs. 1 and 3, and each fold is supported by one of the pins 17. The free end of the hose to which the nozzle 21 is attached is supported by the latch bar 8, in a convenient position to be reached.

In the operation of the rack, the user grasps the nozzle 1 and, giving it a jerk, dislodges the hooked end of the latch bar 9 and swings the same to one side, allowing the first fold of the hose to drop. By exerting a pull upon the hose, the free ends of the pins 17 are removed from their respective pockets successively from the front to the rear end of the rack, allowing the hose to be dropped gradually as it is "paid out". This keeps the hose straight and prevents it from becoming tangled. The presence of the guards 20 insures the pins 17 from becoming lodged in adjacent pockets, and have the effect of actually camming the pins downward as the guards are engaged by the free ends of the pins.

From the foregoing it will be seen that my invention provides a hose rack that is very convenient of use, simple of construction, and that is positive of operation, there being involved no parts which can become stuck through inactivity and cause the rack to fail to operate at a critical moment.

Having thus described my invention, what I claim is:—

1. A hose rack comprising a supporting member, a pair of arms carried by the supporting member, a series of hose supporting pins each having one of its ends pivoted to one of the arms, the other arm having a series of upwardly opening pockets for the support of the free ends of said pins, and a guard for preventing the free end of each pin from entering the next adjacent pocket of the series, when the hose is removed from the rack.

2. A hose rack comprising a supporting member, a pair of arms extending therefrom, a series of hose supporting pins each having one of its ends pivoted to one of the arms, the other arm having a series of upwardly opening pockets for the reception of the free ends of the pins, each pocket having a guard extension which projects from its rear side and overhangs the next pocket to the rear thereof.

3. A hose rack comprising a supporting member, a pair of arms which extend therefrom, a series of hose supporting pins each having one of its ends pivoted to one of the arms, the other arm having an upwardly opening pocket for the reception of the free end of said pin, and a guard located adjacent said pocket for guiding the free end of the pin during its removal from the pocket.

4. A hose rack comprising a pair of opposed supporting members, a series of pins each having one of its ends pivoted to one of said members, the other of said members of said members, the other of said members having a series of upwardly opening pockets for the reception of the free ends of the pins, and a guard located adjacent each pocket for guiding the free end of the pin of such pocket during its removal from the pocket.

5. A hose rack comprising a pair of opposed supporting members, a series of pins each having one of its ends pivoted to one of said members, the other of said members having a series of upwardly opening pockets, each of which is provided with an extension that rises from the rear side of the pocket and extends over the pocket next to the rear thereof.

6. A hose rack comprising a supporting member, a pair of arms extending therefrom, a series of hose supporting pins each having one of its ends sustained by one of the arms, the other arm having a series of upwardly opening pockets for the reception of the free ends of the pins, each pocket having a guard extension which projects from its rear side and overhangs the next pocket to the rear thereof.

7. A hose rack comprising a supporting member, a pair of arms which extend therefrom, a series of hose supporting pins each having one of its ends sustained by one of the arms, the other arm having an upwardly opening pocket for the reception of the free end of said pin, and a guard located adjacent said pocket for guiding the free end of the pin during its removal from the pocket.

8. A hose rack comprising a pair of opposed supporting members, a series of hose supporting pins each having one of its ends sustained by one of said members, the other of said members having an upwardly opening pocket for the reception of the free end of each pin, and a guard located adjacent said pocket for guiding the free end of the pin during its removal from the pocket.

9. A hose rack comprising a substantially cylindrical supporting member that is formed of malleable material and is split on one side from end to end, a pair of arms extending substantially horizontal from the supporting member and substantially parallel to each other, a series of hose supporting pins pivoted to one of said arms, the other of the arms having a series of upwardly opening pockets for the reception of the free ends of the pins, each pocket having a guard extension which projects upward from its rear side and over the next pocket to the rear thereof, and a member pivotally connected to the free end of one of the arms and having a portion that interlocks with the corresponding end of the other arm.

10. A hose rack comprising a substantially cylindrical supporting member that is formed of malleable material and is split on one side from end to end, a pair of arms extending therefrom, a series of hose supporting pins pivoted to one of said arms, the other of the arms having a series of upwardly opening pockets for the reception of the free ends of the pins, each pocket having a guard extension which projects upward from its rear side and over the next pocket to the rear thereof, and a member pivotally connected to the free end of one of the arms and having a portion that interlocks with the corresponding end of the other arm, whereby the arms are maintained slightly under tension with the free ends of certain of the hose supporting pins in engagement with the adjacent walls of the pockets.

In testimony whereof, I hereunto affix my signature in the presence of two witnesses.

MORTIMER C. ROSENFELD.

Witnesses:
MARY U. CUNNINGHAM,
CLARA PHILLIPS.

Copies of this patent may be obtained for five cents each, by addressing the "Commissioner of Patents, Washington, D. C."